(12) United States Patent
Shah et al.

(10) Patent No.: US 8,156,051 B1
(45) Date of Patent: *Apr. 10, 2012

(54) EMPLOYMENT RECRUITING SYSTEM

(75) Inventors: Chetan Shah, Portland, OR (US); Badri Malynur, Beaverton, OR (US); Eric Christian Smith, Portland, OR (US)

(73) Assignee: Northwest Software, Inc., Portland, OR (US)

( * ) Notice: Subject to any disclaimer, the term of this patent is extended or adjusted under 35 U.S.C. 154(b) by 1998 days.

This patent is subject to a terminal disclaimer.

(21) Appl. No.: 09/757,322

(22) Filed: Jan. 9, 2001

(51) Int. Cl.
*G06Q 50/00* (2012.01)
*G06Q 10/00* (2012.01)
(52) U.S. Cl. ......................................... 705/310; 705/1.1
(58) Field of Classification Search ...................... 705/1
See application file for complete search history.

(56) References Cited

U.S. PATENT DOCUMENTS

| | | | | |
|---|---|---|---|---|
| 5,544,049 | A | * | 8/1996 | Henderson et al. ............... 704/7 |
| 5,579,407 | A | * | 11/1996 | Murez ............................. 382/164 |
| 5,758,324 | A | * | 5/1998 | Hartman et al. ................... 705/1 |
| 5,832,497 | A | | 11/1998 | Taylor |
| 5,884,270 | A | * | 3/1999 | Walker et al. ...................... 705/1 |
| 5,978,768 | A | * | 11/1999 | McGovern et al. ................ 705/1 |
| 6,052,122 | A | * | 4/2000 | Sutcliffe et al. ................. 345/751 |
| 6,064,952 | A | * | 5/2000 | Imanaka et al. ................... 704/9 |
| 6,266,659 | B1 | * | 7/2001 | Nadkarni ........................... 707/3 |
| 6,266,668 | B1 | * | 7/2001 | Vanderveldt et al. ............. 707/10 |
| 6,272,467 | B1 | * | 8/2001 | Durand et al. .................... 705/1 |
| 6,370,510 | B1 | * | 4/2002 | McGovern et al. ............... 705/1 |
| 6,381,592 | B1 | * | 4/2002 | Reuning ............................ 707/3 |
| 6,385,620 | B1 | * | 5/2002 | Kurzius et al. ............. 707/104.1 |
| 2001/0034011 | A1 | * | 10/2001 | Bouchard ...................... 434/236 |
| 2001/0034630 | A1 | * | 10/2001 | Mayer et al. ........................ 705/7 |
| 2001/0039508 | A1 | * | 11/2001 | Nagler et al. ..................... 705/11 |
| 2001/0042000 | A1 | * | 11/2001 | Defoor, Jr. .......................... 705/9 |
| 2002/0019768 | A1 | * | 2/2002 | Fredrickson et al. ........... 705/14 |
| 2002/0026452 | A1 | * | 2/2002 | Baumgarten et al. ....... 707/104.1 |
| 2002/0046074 | A1 | * | 4/2002 | Barton .............................. 705/8 |
| 2002/0055866 | A1 | * | 5/2002 | Dewar .............................. 705/8 |
| 2002/0055870 | A1 | * | 5/2002 | Thomas ........................... 705/10 |
| 2002/0072946 | A1 | * | 6/2002 | Richardson ....................... 705/8 |
| 2002/0091669 | A1 | * | 7/2002 | Puram et al. ...................... 707/1 |
| 2002/0099700 | A1 | * | 7/2002 | Li ..................................... 707/5 |
| 2002/0133369 | A1 | * | 9/2002 | Johnson ........................... 705/1 |

FOREIGN PATENT DOCUMENTS

| | | | |
|---|---|---|---|
| JP | 11338881 A | * | 12/1999 |
| JP | 11338882 A | * | 12/1999 |

OTHER PUBLICATIONS

Greengard, Samuel, "Catch the wave as HR goes online," Personnel Journal, v74n7, pp. 54-68, Jul. 1995.*
Parkes, Clara H., "Job-shopping Web-style: Web sites match companies and job seekers in ways previously impossible." DBMS, v10, n1, pS37(3), Jan. 1997.*
Useem, Jerry, "The matchmaker," Inc., v20n18, pp. 70-83, Dec. 1998.*

(Continued)

*Primary Examiner* — Jonathan Ouellette

(57) ABSTRACT

Recruiting or the process of locating and qualifying potential candidates for employment is largely a manual process consuming significant resources. The employment recruiting system automates many of the services related to employment recruiting. Position advertisements and candidate resumes are stored in computer searchable data bases. A data processing device automatically searches the data base containing candidate resumes in response to a search parameter associated with a position advertisement. The system automatically contacts screens candidates.

9 Claims, 8 Drawing Sheets

OTHER PUBLICATIONS

Useem, Jerry, "For sale online: You," Fortune, v140n1, pp. 66-78, Jul. 5, 1999.*
"recruitsoft.com Increases Strategic Functionality of Web-Based Hiring Management System." Business Wire, Jun. 29, 2000.*
www.monster.com, Screen Print, Jan. 24, 1998.*
"Intellimatch Redesigns Web Site and Expands Personalized Services for Job Seekers and Employers; Release 2.0 Builds Job Agent Feature into Precision-Matching Technology," Business Wire, Dec. 23, 1996.*
www.simpatix.com, Retrieved from Internet Archive Wayback Machine <www.archive.org>, Date Range:Nov. 16, 1999-Jan. 29, 2000.*
"Simpatix Launches Hiretrack, Web-based Recruiting Software with Enhanced Pre-screening Capabilities," Business Wire, Feb. 24, 1999.*
"TekMetrics Help EDS Select Top Sales Talent Online." PR Newswire, Apr. 29, 1999.*
"SkillSet Announces General Availability of Employment Exchange 2.0; Web Technology Provides Next Generation of Enterprise Workforce Management." Business Wire, Jun. 8, 1999.*
Lee, Mie-Yun, "Effective Web Recruiting Takes Planning." Crain's Cleveland Business, p. 31, Jun. 14, 1999.*
Hays, Scott, "Kinko's dials into automated applocant screening," Workforce. v78n11, pp. 71-72, Nov. 1999.*
"Advantage Hiring Tools Target Internet Recruiters; Online Screening and Interviewing Applications Cater to Electronic Job Boards." PR Newswire, Dec. 7, 1999.*
USPTO Palm Intranet Screen Print, Provisional U.S. Appl. No. 60/173,669, Frederickson et al, filed Dec. 30, 1999.*
Home page—http://www.bestjobsusa.com.
Home page & job search page—http://www.monster.com.

* cited by examiner

ADD OR MODIFY A JOB?

| | | |
|---|---|---|
| JOB STATUS | OPEN ▽ | |
| POSTING DATE | | |
| JOB DESCRIPTION | | |
| JOB ID | | |
| DISCIPLINE | ACCOUNTING ▽ | |
| JOB TITLE | | |
| LOCATION | | |

JOB TYPE
 ⦿ FULL TIME  ○ PART TIME  ○ CONTRACT  ○ INTERNSHIP

COMPENSATION
 MINIMUM [    ]   MAXIMUM [    ]
 ○ HOURLY  ○ WEEKLY  ⦿ MONTHLY  ○ ANNUAL

CONTACT INFORMATION
 FIRST NAME
 LAST NAME
 PHONE NUMBER
 E-MAIL
 STREET
 CITY [    ] STATE [    ]
 COUNTRY [    ] POSTAL CODE [    ]

HIRING MANAGER
 FIRST NAME
 LAST NAME
 PHONE NUMBER
 E-MAIL
 STREET
 CITY [    ] STATE [    ]
 COUNTRY [    ] POSTAL CODE [    ]

SPECIFY SKILLS  ▷

FIG. 4

RECRUITING CONTROL CENTER

RECRUITER NAME [    ] ⎱ 142
RECRUITER ID   [    ] ⎰

140

| JOB ID | TITLE | DATE POSTED | COMPANY | DEPARTMENT | LOCATION |
|---|---|---|---|---|---|
| 001 | PROGRAMMER | XX/XX/XX | ABC INC. | ENGINEERING | DALLAS, TX |
| 002 | ENGINEER | XX/XX/XX | ABC INC. | ENGINEERING | DALLAS, TX |

| JOB | HIRING MANAGER | CANDIDATES TOTAL | CANDIDATES SCREENED IN | CANDIDATES SCREENED OUT |
|---|---|---|---|---|
| 001 | ABC | 50 | 30 | 20 |
| 002 | TAL | 36 | 20 | 16 |

FIG. 8

EMPLOYMENT RECRUITING SYSTEM

CROSS-REFERENCE TO RELATED APPLICATIONS

Not applicable.

BACKGROUND OF THE INVENTION

The present invention relates to an employment recruiting system and, more particularly, a method and system for automating services related to employment recruiting.

The objective of employment recruiting is to locate and qualify candidates to satisfy the needs of employers' as evidenced by open employment positions. Generally, the availability of a job opening must be communicated to persons who may be interested in the position, contact must be established between potential job candidates and the employer, and a group of candidates must be screened and interviewed to identify the candidate most suited for the position. Whether the employer undertakes all of these tasks or retains an outside agency to provide recruiting services, locating and screening candidates for employment is a labor, time, and, therefore, cost intensive process.

Recruiters may be retained to locate candidates by directly contacting potentially interested persons. However, this method of locating candidates is relatively expensive and is generally reserved for recruiting for highly compensated, executive positions. Probably, the most common approach to locating candidates outside of the hiring organization is direct advertising of the availability of the position. Generally, a recruiter will prepare an advertisement describing job duties; required experience, skills, and other qualifications; and providing contact information to facilitate interaction between interested persons and the recruiter. Typically, interested persons are directed to reply to the advertisement by sending a resume to a person designated in the advertisement. Resumes received in response to an advertisement are typically organized and screened by the recruiter or a human resources specialist before being passed to a manager responsible for filling the position. The organization of resumes and the pre-screening of candidates may require a significant amount of time, particularly in large companies which may have a number of positions open at any time. Before being reviewed by the hiring manager, the resumes may be further screened by a person or group within the hiring department having knowledge of the technical requirements of the job. Finally, the hiring manager may review all or a portion of the resumes received in response to the advertisement to select candidates for a personal interview.

Traditionally, job advertisements have been published in newspapers and in magazines directed to particular groups likely to include potential applicants. As the labor pool has become more mobile, the limitations of print advertising have become significant impediments to the recruiting process. Generally, newspapers have a limited number of subscribers and a limited geographical circulation and purchasing advertising space in a number of newspapers substantially increases the cost of recruiting. While magazines often have national circulation, there are often several magazines that are directed to a particular trade or specialty and the cost of reaching a large pool of potential job applicants by advertising in several magazines can be quite high.

With the development of the Internet and the World Wide Web (the web) many employers have begun posting job advertisements on the employer's company web site. In addition, many newspapers and magazines post advertised positions on web sites as well in their printed publications. While these web sites are accessible to any person with access to the web, potential job applicants must be aware of the company or publication and must repeatedly visit a number of web sites to determine what jobs are available in the field or geographic location of interest. The inefficiency of this process has been addressed by the development of employment bulletin boards on the web.

A number of potential employers can post position advertisements on an employment bulletin board, such as www.monster.com, and www.bestjobsusa.com, where the advertisements can be viewed by potential job applicants accessing the web site. Typically, employment bulletin boards facilitate candidate searching of posted advertisements by occupation, key words, and location, reducing the time required for a job seeker to investigate the large number of position advertisements posted on the bulletin board. In addition to hosting job position advertisements posted by employers, many employment bulletin boards permit potential job applicants to post a resume. If the potential applicant finds an advertisement of interest, a resume can be sent by e-mail directly from the bulletin board to the potential employer. McGovern et al., U.S. Pat. No. 5,978,768 describes a computerized job search system that includes a computer-based "personal search agent" that permits a job seeker to periodically monitor new position advertisements posted on the employment bulletin board. When the personal search agent identifies a match between the potential applicant's qualifications and interests and the requirements of an advertised position, the computer will send e-mail to the job seeker identifying the advertised position. The applicant can then cause a resume to be e-mailed to the potential employer and the system can automatically notify the applicant by e-mail when the resume is received by the employer. Further, the system has facilities for converting a resume to text for storage in a searchable data base. Storing a resume as text facilitates manual screening and evaluation of resumes received in response to an advertisement. Employment bulletin boards increase the availability of information about job openings, make it easier for job seekers to find positions of interest and facilitate interaction between potential applicants and employers. However, bulletin boards are of limited utility in assisting employers in sourcing potential job applicants and screening candidates to identify a candidate most suitable for employment. Further, the many of the processes used in recruiting and presenting qualified candidates to the potential employer are manual processes requiring considerable time from job applicants, employees of the and outside contractors representing the potential employer.

What is desired, therefore, is an employment recruiting system that automates the tasks involved in sourcing, screening and presenting qualified job applicants to an employer with employment needs.

BRIEF DESCRIPTION OF THE DRAWINGS

FIG. 4 illustrates an exemplary computer screen for position advertisement entry.

FIG. 8 illustrates an exemplary computer screen reporting results of a position search.

DETAILED DESCRIPTION OF THE INVENTION

The objective of employment recruiting is to locate, screen, and present qualified candidates to fill available employment positions. Generally, the availability of a job opening must be communicated to persons who may be interested in the position, contact must be established between potential job candidates and the employer, and candidates must be screened and then interviewed to identify the candidate best suited for the position. Whether the employer undertakes all of these tasks or retains an outside agency to provide recruiting services, the process of locating and screening or qualifying candidates for employment is labor and time intensive and, therefore, costly.

Probably, the most common method of communicating the availability of an employment position to potentially interested persons is direct advertisement. Traditionally, advertisement of available positions has been undertaken primarily through printed media, including newspapers and magazines. The advent of the World-Wide-Web (the web) has prompted employers to post job advertisements on company web sites. In addition, many newspapers and magazines also provide a web site for posting job advertisements carried in the printed medium. However, accessing these web sites requires that applicants be aware of the company or publication and repeatedly visit a list of sites which might post jobs of interest.

Figure 1:
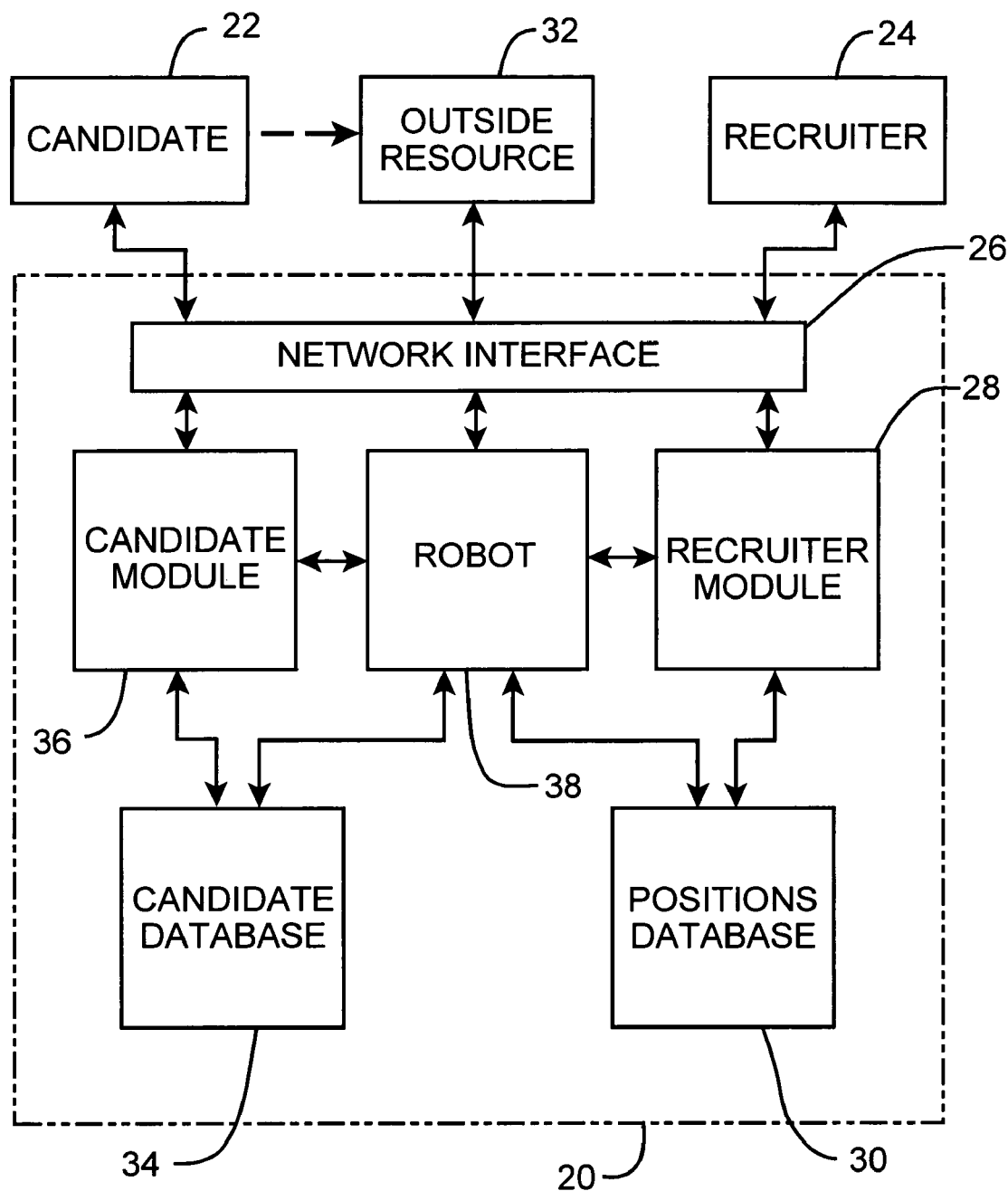
FIG. 1 is a block diagram of the employment recruiting system.

The inefficiency of searching out and repeatedly accessing a list of web sites with position advertisements has lead to the development of electronic employment bulletin boards where position advertisements may be posted by a number of employers. Electronic bulletin boards usually include facilities to permit job seekers to search posted advertisements for positions of interest. Electronic bulletin boards also typically permit a job seeker to post a resume to a database. The bulletin board may also facilitate contact between job candidates and recruiters through the use of e-mail to forward resumes from the resume database to the recruiter. One result of wider and more effective position advertising, a strong job market, and changing attitudes concerning length of employment is an increase in the time and effort required for employers to effectively locate and qualify candidates for a substantial number of available positions. The present inventors came to the realization that many of the manual tasks involved in recruitment could be effectively automated in an integrated recruiting system. Referring to FIG. 1, the recruiting system 20 of the present invention automates many of the tasks involved in locating and screening candidates and facilitates presentation of qualified candidates 22 to hiring employers.

Figure 2:
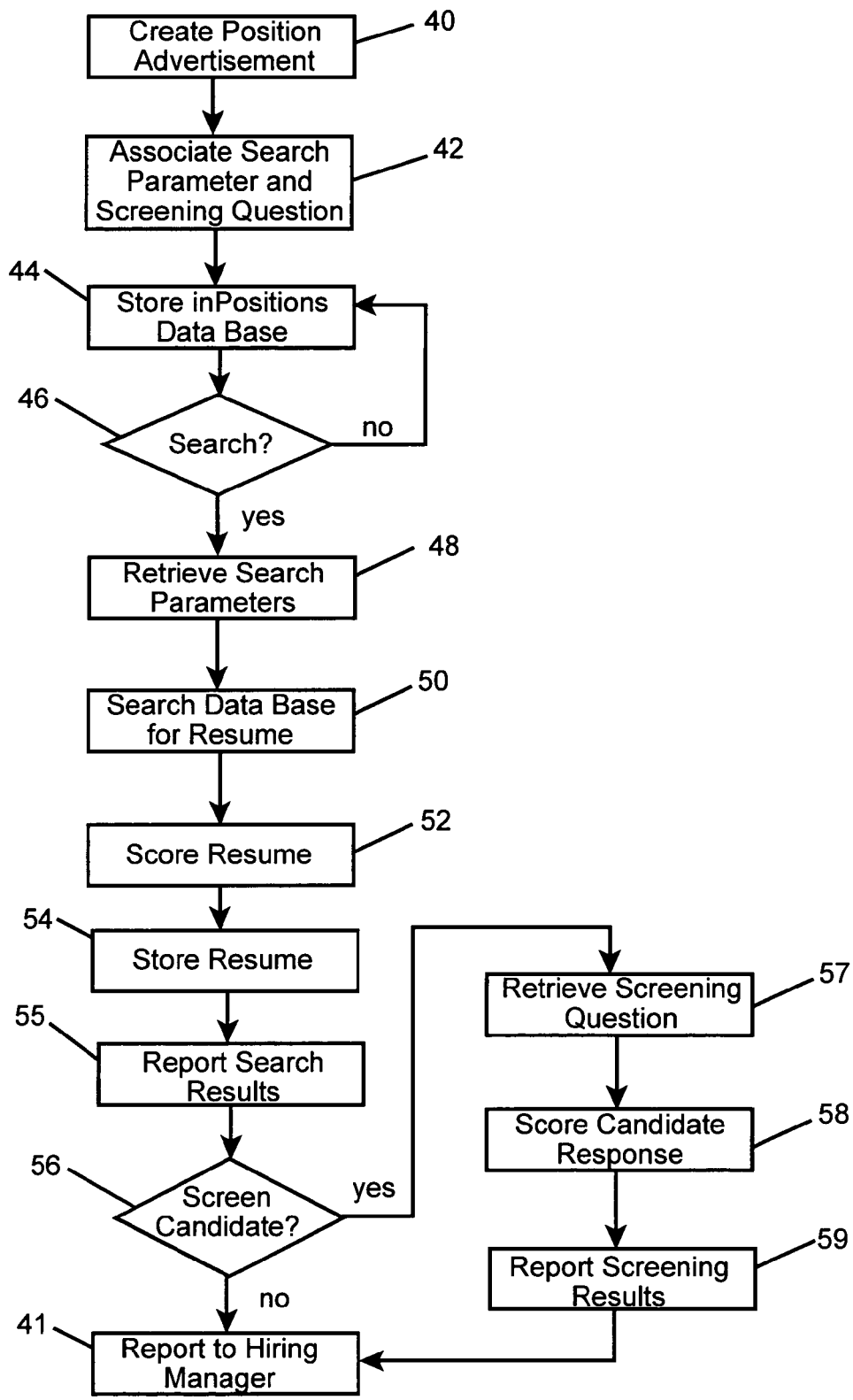
FIG. 2 is a flow diagram of the recruiting method of the present invention.

The recruiting process is initiated when a position becomes available with an employer. The hiring manager prepares a position questionnaire or job description expressing the employer's needs. Typically, the position questionnaire outlines the job title; the job duties; compensation; required and desired experience, education, certification, and skills; and whether the job is a full- or part-time position. When the job description is complete, the hiring manager typically directs a recruiter 24, who may be either employed by the hiring company or an outside contractor, to locate candidates qualified for the position described in the position questionnaire. Referring to FIG. 2, the recruiter 24, in consultation with the hiring manager, prepares a position advertisement usually including the job title; the job duties; and education, skills and certification requirements 40. The position advertisement may also include information concerning benefits offered by the employer, other general information about the employer, and contact instructions to enable interested persons to contact the recruiter 24. When the position advertisement is completed, the recruiter 24 publishes the advertisement as directed by the employer. The advertisement may be placed in print media such as newspapers and magazines. In addition, the recruiter may post the advertisement on one or more web sites.

Figure 3:
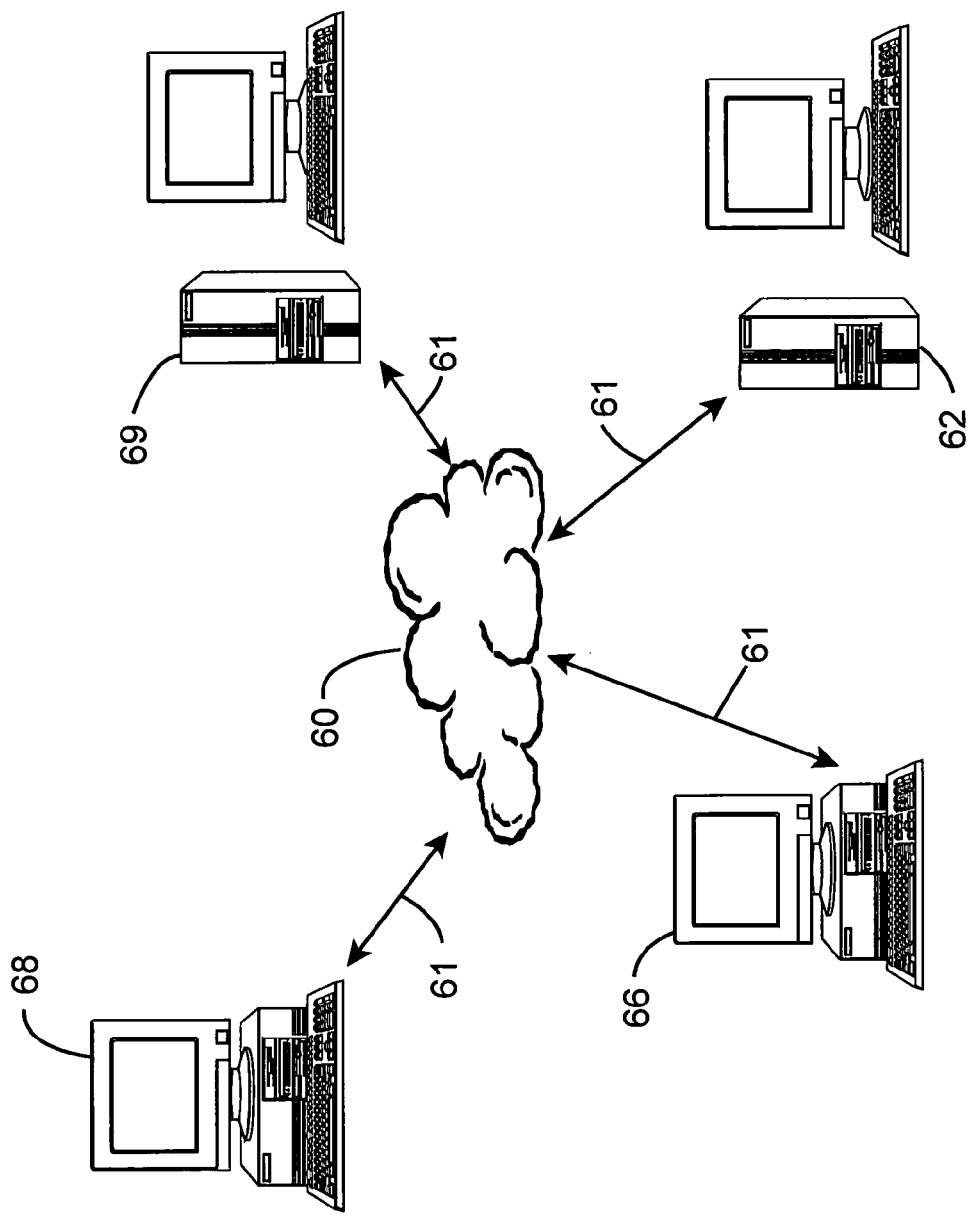
FIG. 3 is a schematic illustration of a computer network.

Referring to FIG. 3, the World Wide Web (the "web") comprises a network of interconnected servers that supports hypertext to access several Internet protocols on a single interface. Typically, computers connected to the web have utilized a client/server architecture with a server computer providing files and services to a user's client machine. Web sites comprise collections of computer accessible files resident on one or more computers having a communication connection 61 to the web 60. For example, company web sites, electronic bulletin boards and web sites of traditional print media (collectively referred to as outside resources) are resident on one or more servers 62 connected to the web 60. Web sites may offer employment advertising posting services on a free or "for fee" basis. The web sites are accessible to computer users having computers connected to the web, including, for example, a job candidate's computer 66 and a computer 68 operated by a recruiter 24. The recruiting system of the present invention is typically implemented as a web site on a web server computer 69 connected to the web 60 by a network interface 26.

Referring again to FIG. 1, the recruiter 24 may contact the recruiting system 20 through a recruiter module 28 to submit a position advertisement for inclusion in a positions database 30 of the recruiting system or to monitor responses from job candidates 22. The positions database 30 is a computer searchable data structure that is typically implemented as a relational database. Referring to FIG. 4, a job advertisement may be input to the system 20 through a position advertisement entry computer screen 70 of the user interface implemented in the recruiter module 28. The position advertisement entry screen 70 typically includes entries related to identifying and generally describing a position to be filled (indicated by a bracket) 72. Further a recruiter or other contact 74 (indicated by a bracket) and the hiring manager 76 (indicated by a bracket) may be identified and associated with the position. To increase uniformity and reduce the time required to describe positions, the exemplary position advertisement entry computer screen 70 utilizes pull down menus and lists 78 and check boxes 77. Clicking a button 79 on the position advertisement entry screen 70, causes the system 20 to display a screen facilitating the description of a position's duties and the desired qualifications of a candidate.

Figure 5:
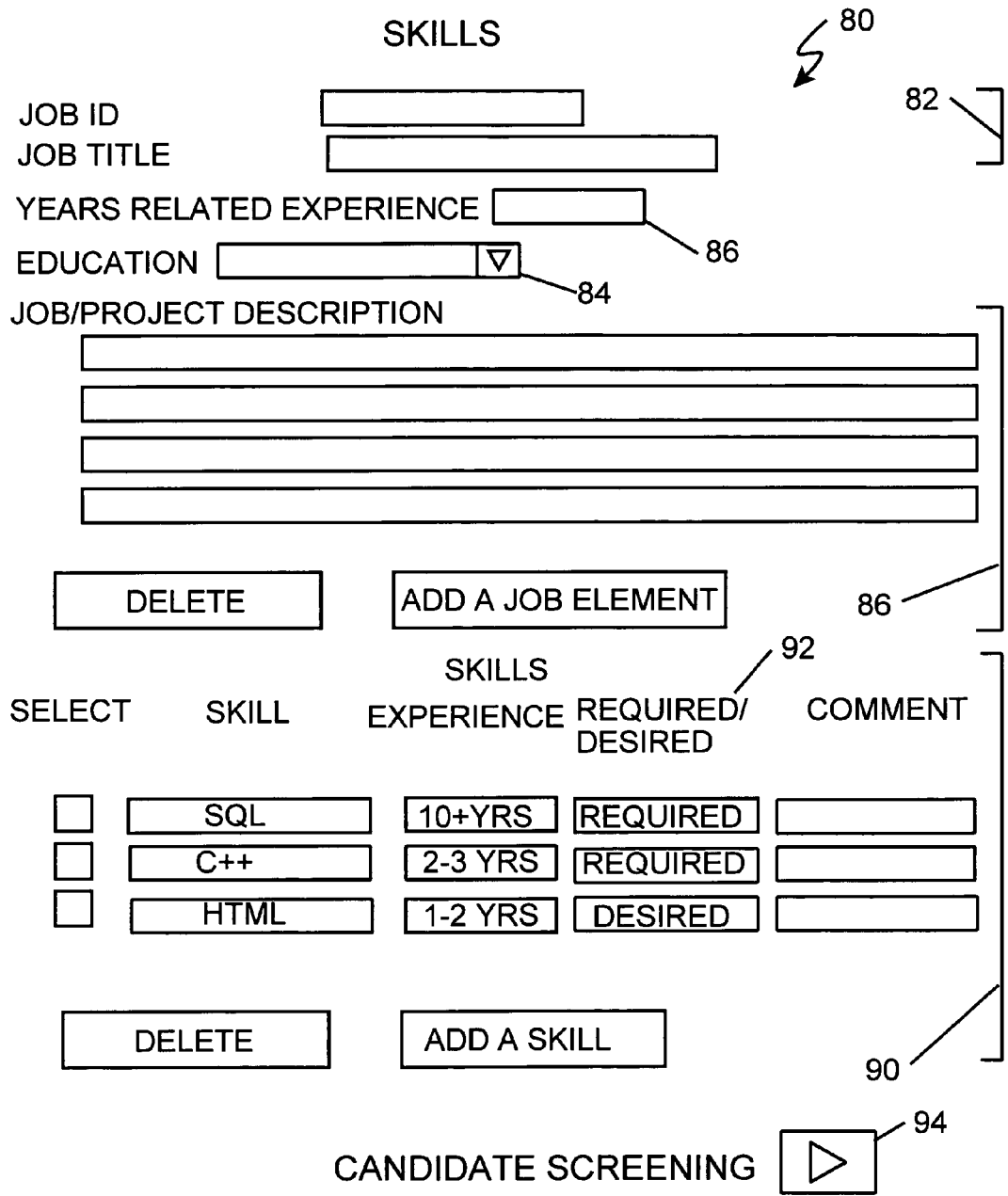
FIG. 5 illustrates an exemplary computer screen for position skills description.

Referring to FIG. 5, an exemplary skills entry screen 80 includes information from the positions advertisement entry screen 70 identifying the position 82 (indicated by a bracket). The skills entry screen 80 typically permits the recruiter to describe the required level of education 84 and related experience 86. In addition, the skills entry screen 80 provides a single line description of each job duty 88 (indicated by a bracket), skill, or other candidate qualification element 90 (indicated by a bracket). The single line entry form provides a crisper description of the job requirements and candidate qualifications permitting accurate and thorough automated screening of potential candidates and facilitates a focused response by the candidate emphasizing the correspondence of the candidate's experience and the specific needs of the employer. In the case of the education, skills, certification or other qualifications, the system prompts the recruiter to indicate whether the qualification element is required or desired 92. Possessing a particular skill may make a candidate more attractive for a position but the skill may not be necessary for successful performance of the job duties. The significance of a candidate qualification can be used in weighting the scoring of resumes to show preference for candidates having desirable skills while ensuring that selected candidates have the required skills for the position.

To assist the recruiter 24 in preparing a job advertisement the recruiter module 28 includes a database of job templates providing predefined single line job description elements including skills and screening questions for many jobs. In addition to storing the position advertisement in the positions database 30, the recruiter 24 is prompted to associate with the advertisement keywords expressing candidate qualifications to be used as search parameters 42 in an automated search of the candidates database 34 and the computerized databases of the outside resources 22. By way of example only, keywords may express job activities and duties, education, skills and certification requirements. The keywords may also be weighted to express a significance of a candidate qualification sought by the employer. The system uses keywords to select a targeted list of e-mail recipients to receive notice of the associated position advertisement.

Figure 6:
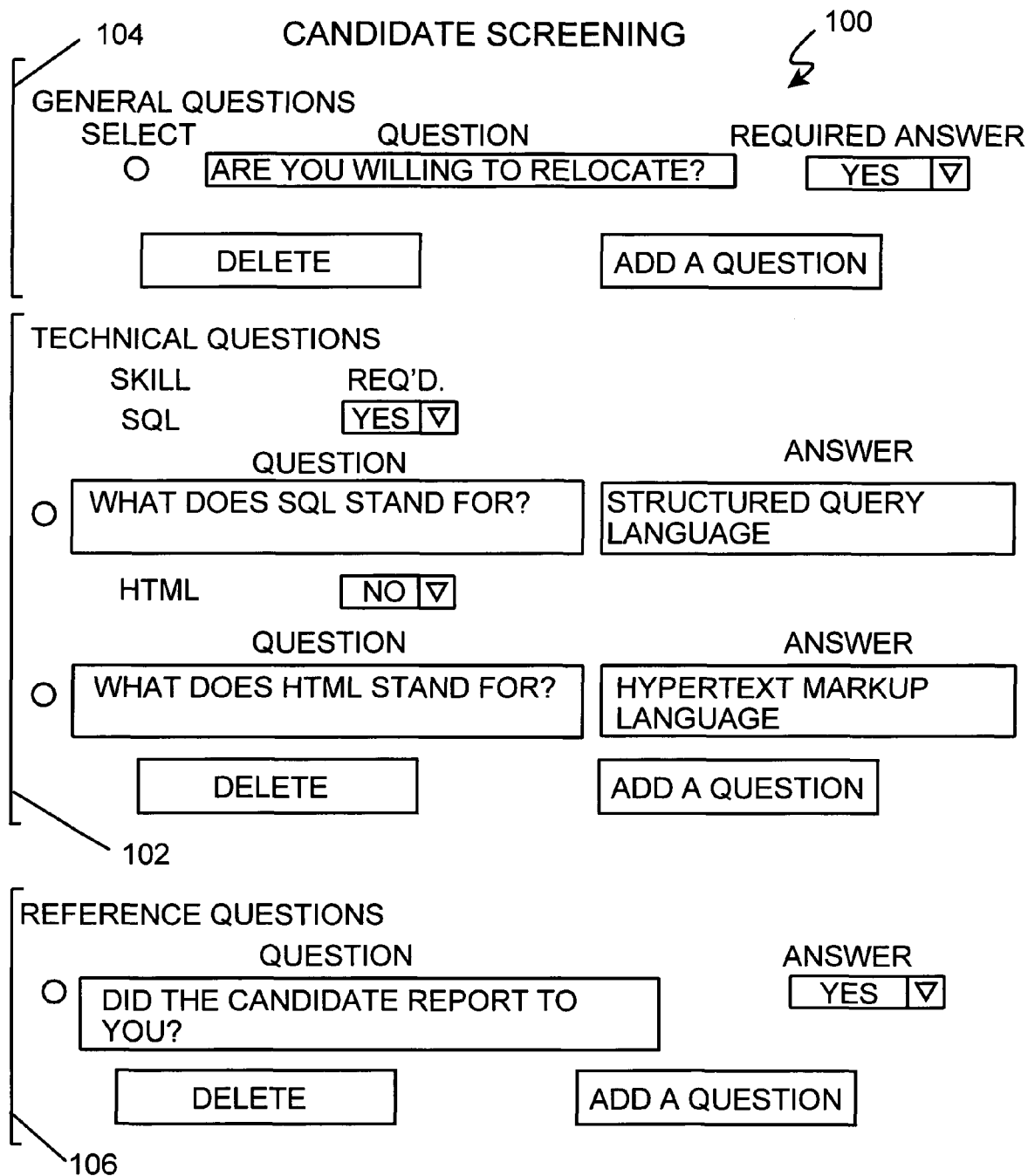
FIG. 6 illustrates an exemplary computer screen for screening questions description.

The recruiter 24 can also associate screening questions with the position advertisement 42 for storage in the positions database 44. Clicking a button 94 on the skills entry screen 80 causes the system 20 to display a screening questions description screen 100, as illustrated in FIG. 6. Screening questions are typically high level technical 102 and employment 104 related questions (indicated by brackets) asked of substantially all applicants in the first round of candidate screening. The recruiter module 28 can suggest typical technical and other screening questions related to many jobs, but the recruiter 24 may also include custom screening questions to be associated with a particular advertisement or employer. The recruiter may also include gating questions, such as willingness to relocate, requiring a specific response to avoid exclusion of the candidate.

Figure 7:
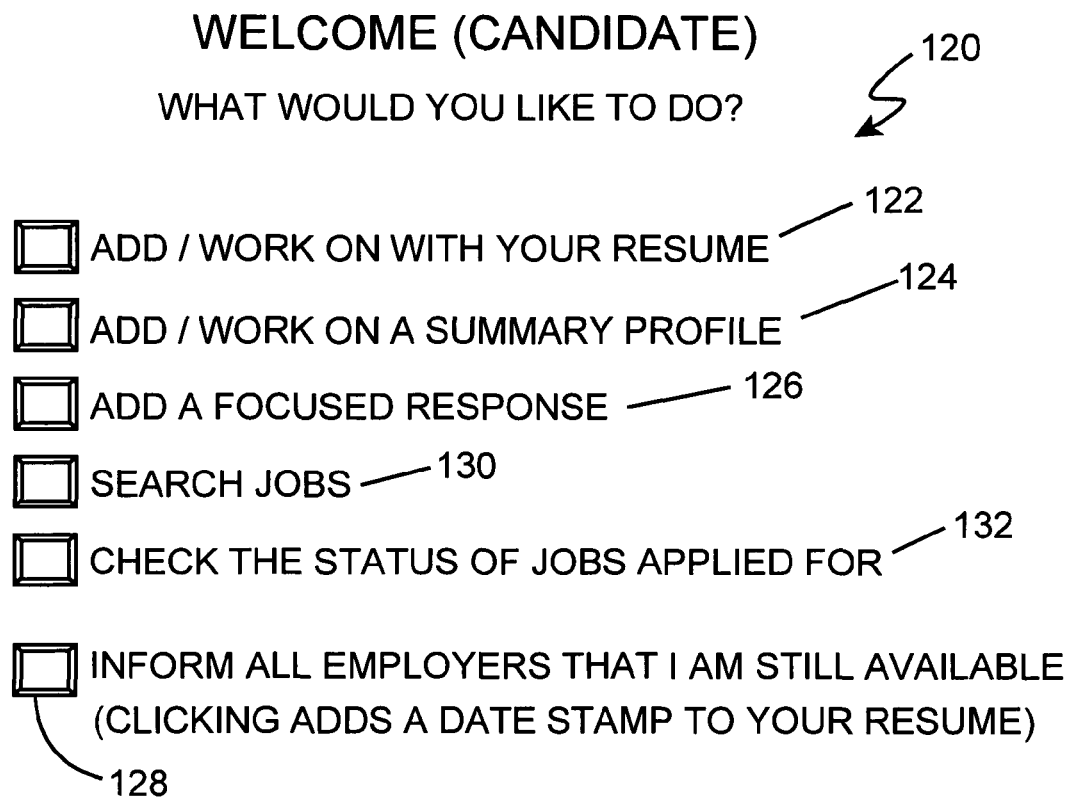
FIG. 7 illustrates an exemplary computer screen facilitating candidate interaction with the recruiting system.

Job seekers or candidates 24 interact with the recruiting system 20 through a user interface provided by a candidate module 36. The candidate module 36 provides communication services and facilitates candidate 24 interaction with the system 20. Referring to FIG. 7, an exemplary candidate interaction screen 120 displayed to a candidate 24 by the candidate module 36 permits a candidate to post a resume 122 to a candidate database 34 or to modify an existing resume. The candidate database 34 is a computer searchable data structure that is typically implemented as a relational database. To facilitate the automated processes of the recruiting system 20 and manual review of resumes, the candidate module 36 can provide a template for a resume to be submitted by the candidate. Candidates can also search 130 the positions database 30 for job advertisements of interest. The candidate module 36 may be used to direct e-mail messages from the recruiting system 20 to the candidate 22 or from the candidate to recruiters 24. This enables a focused e-mail response 126 to an invitation to apply for a position stating why the candidate is particularly suited for an advertised position. The focused response offers the candidate the opportunity to point out the candidate's experience, training, and skills that correspond to the single line requirements of the position advertisement and to provide a persuasive message to persons evaluating the candidate. The focused response typically accompanies a copy of the candidate's resume from the candidate database 34. Through the candidate module 36 the candidate 22 can also check the status of jobs for which the candidate has applied 132 and by clicking a button inform employers that the candidate remains available for new employment 128. The focused response inputs of the candidate are stored by the system for use in responding to later job advertisements.

Some persons contacting the recruiting system 20 may be interested in other employment but not be actively seeking new employment at the time. The candidate module 36 includes facilities to enable interested individuals to enter a profile or summary of their qualifications and job interests 124 in the candidate database 34. The individual can elect to receive e-mail notification when an advertisement including requirements matching the profile is added to the positions database 30. This permits capturing data related to persons not immediately seeking new employment but who might be interested if the right opportunity arises.

Many of the automated functions of the recruiting system 20 are performed by a recruiting robot 38. The robot 38 comprises a data processing device including a set of instructions that causes the robot to search designated computer accessible databases, including the candidate database 34 and resume databases of outside resources 32 to locate candidates matching the requirements of stored positions advertisements. The outside resources 32 can include company web sites, electronic bulletin boards providing free access or "for fee" access to resume databases and may include web-based news groups of interest to certain occupations or groups. Through the recruiter module 28 the recruiter 24 specifies search parameters 42, including keywords and database identities, to be used by the robot 38 in database searching. To initiate a search, the recruiter 24 associates search parameters with the position advertisement indicating the periodicity of searches to be undertaken by the robot and identifying the databases to be searched. The system incorporates a data dictionary to provide additional related keywords to be used in association with the keywords specified by the recruiter. As instructed in the search parameters 46 the robot 38 periodically obtains the appropriate keywords associated with a position advertisement from the positions database 48 and searches the appropriate databases 50. Upon contacting an outside resource 32, the robot 38 executes an instruction that parses the candidate resumes stored in the outside resource's database and analyzes the text to locate character strings matching in the resume corresponding to the keywords of the robot's search parameters. The robot 38 includes a scoring instruction that scores the candidate's resume 52, typically as a function of the occurrences of keywords in the resume and any significance assigned to keywords in the search parameters. If the scoring exceeds a threshold established by the recruiter 24, the robot 38 will download the resume for storage in the candidate database 54 and report to the recruiter 55. The robot 38 periodically repeats the search of the specified databases as instructed in the search parameters 46. The recruiter module 28 provides a control center for the recruiter 24 displaying the progress of searches initiated by the recruiter. Referring to FIG. 8, an exemplary recruiting control center screen display 140 identifies the recruiter 142 (indicated by a bracket) and lists the progress of searches initiated by the recruiter. For example, searches can be identified by job identification 144, job title 146, employer 148 and hiring manager 150. Further, by way of example only, the number of candidates located by a search 152, the numbers of candidates remaining after screening 154 and the number of candidates eliminated by screening 156 can be reported.

In addition, through the recruiter module, the recruiter 24 can direct the robot 38 to contact responding candidates and request a response to the technical and prescreening questions associated with the position advertisement 56 and obtained from the positions database 57. Typically, an e-mail message will be sent to the candidate 22 requesting that the candidate access the system and respond to the technical and prescreening questions. When the candidate 22 contacts the system 20, the candidate module 36 displays the technical 102 and general 104 prescreening questions and accepts answers. The robot 38 scores the responses 58, stores the score in the candidate database 34, and reports the score to a recruiter 59 upon a request for a report of progress in locating candidates for a position advertisement. When the recruiter reviews the progress of the search for candidates, the prescreening scores can be reported and resumes of interest obtained from the candidate database for further review and screening. The recruiter can report the search results to the hiring manager at any time 41.

When the robot 38 identifies a potential candidate either from the candidate database 34 or the database of an outside resource 32, it extracts the candidate's e-mail address from the resume or an abbreviated profile in the candidate database 34 and sends e-mail to the potential candidate inviting the individual to apply for the advertised position.

A candidate 22 with a resume stored in the candidate database 34 may respond to an e-mail invitation to apply for a position by forwarding a copy of the resume by e-mail to the recruiter 24. In addition, the recruiting system provides an opportunity for a candidate 22 to provide a focused response to the invitation. Referring to FIG. 7, a candidate 22 may provide a message 126 to accompany a resume expressing why the candidate 22 is particularly suited for the specific job in question. A focused response makes manual review of the candidate's qualifications easier and improves the likelihood that the hiring manager will decide to interview the candidate. The focused response is stored in the candidate database 34 in association with the candidate's resume.

A potential candidate 30 whose raw resume has been downloaded from an outside resource 32 can also be requested to provide a resume for the candidate database 34 in the standardized format provided by the system 32. In addition, the candidate can provide a focused response to accompany the resume when forwarded to the recruiter 24. The recruiting system 24 periodically sends a message to candidates 22 requesting an update of the candidate's availability. The candidate module 34 permits the candidate 22 to update employment availability with a single click of a mouse button 128 adding an availability date stamp to the resume stored in the candidate database 34. The uniformity of resume formats in the candidate database 34 improves the effectiveness of automated screening and reduces the time and effort required when manually screening a group of resumes.

When directed by the recruiter 24 and the candidate 22, the recruiting system 20 can contact references listed in the candidate's resume. An e-mail message including appropriate reference questions 106 (see FIG. 6) is directed to the reference at the e-mail address listed in the candidate's resume. Responses received from references by return e-mail are stored in the candidate database 34 in association with the candidate's resume and are forwarded to the recruiter 24.

When the hiring manager receives a group of resumes to consider the high level screening has been completed, the candidates have been scored, and the most suitable candidates identified. After reviewing the resumes the hiring manager can request the recruiter 24 to contact certain candidates 22 by e-mail through the facilities of the system 20 for an interview. The hiring manager may also order a background check or drug testing for a selected candidate through the system. Since many of the tasks involved in locating and qualifying job candidates are performed with little or no human intervention, the time and expense of hiring activities can be substantially reduced.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of identifying a candidate for a position of employment, said method comprising the steps of:
    (a) creating a position advertisement including a datum particularizing said position of employment;
    (b) storing said position advertisement in a computer searchable position database;
    (c) associating a keyword with said position advertisement;
    (d) assigning a significance to said keyword;
    (e) associated at least one candidate screening question with said position advertisement;
    (f) associating a search periodicity with said position advertisement;
    (g) upon expiration of a period substantially equal to said search periodicity, searching at least one computer searchable candidate database for a candidate resume including said keyword;
    (h) scoring a candidate resume identified by said search as a function of said keyword;
    (i) influencing said scoring of said candidate resume as a function of said significance of said keyword;
    (j) upon identification of a candidate resume by said search, automatically requesting a response to said candidate screening question from a candidate resume identified by said search;
    (k) scoring a response by said candidate to said candidate screening question;
    (l) assigning a significance to said response;
    (m) influencing said scoring of said response as a function of said significance of said response; and
    (n) presenting an identity of a candidate associated with said candidate resume identified by said search to a computer user on a basis of said score.

2. The method of claim 1 wherein the step of scoring a candidate resume identified by said search as a function of a keyword comprises the steps of:
    (a) identifying a number of occurrences of said keyword in said candidate resume identified by said search; and
    (b) comparing said number of occurrences to a threshold number of occurrences.

3. The method of claim 1 further comprising the steps of:
    (a) associating an identity of a computer searchable candidate database with said position advertisement; and
    (b) searching said candidate database associated with said position advertisement upon expiration of a period substantially equal to said search periodicity.

4. The method of claim 1 wherein the step of searching at least one computer searchable candidate database comprises the steps of:
    (a) storing an identity of a searchable, computer network accessible, candidate database;
    (b) upon expiration of a period substantially equating said search periodicity, accessing said computer network accessible candidate database with a computer;

(c) analyzing a text of a candidate resume stored in said computer network accessible candidate database;

(d) scoring an occurrence of said keyword in said text of said candidate resume; and (e) as a function of said scoring, copying said candidate resume to another candidate data base.

5. The method of claim 1 wherein the step of creating a position advertisement comprises the steps of:

(a) accessing a position advertisement template, said template comprising of at least one candidate qualification entry; and (b) including in a candidate qualification entry of said template no more than one candidate qualification.

6. The method of claim 5 further comprising the step of identifying at least one keyword associated with a candidate qualification entry.

7. A method of employment recruiting comprising the steps of:

(a) creating a position advertisement, including a datum particularizing a position of employment;

(b) associating a keyword with said position advertisement;

(c) storing said position advertisement and said keyword in a computer searchable database;

(d) assigning a significance to said keyword;

(e) associating a search periodicity parameter in a computer searchable database;

(f) in response to expiration of a period substantially equal to said search periodicity parameter, initiating a computer search of at least one computer searchable candidate database for a candidate resume including said keyword;

(g) scoring a candidate resume identified by said search as a function of said included keyword;

(h) influencing said score of said candidate resume as a function of significance of said keyword, (i) including an identification of a candidate associated with said candidate resume in a result reportable to a computer user if said keyword score of said candidate resume at least equals a threshold keyword score;

(j) in response to a determination that said keyword score at least equals said threshold keyword score, automatically contacting said candidate and requesting a response to at least one screening question associated with said position advertisement;

(k) scoring a response of said candidate to said screening question; and (l) reporting said screening question response score in a search result presented to said computer user.

8. The method of claim 7 further comprising the steps of:

(a) requesting said candidate approve contact with an employment reference;

(b) upon receipt of said approval, automatically requesting a response of said employment reference to at least one reference query; and (c) reporting said response to said reference query in a search result presented to said computer user.

9. The method of claim 7 further comprising the step of automatically repeating said search in response to expiration of a period substantially equal to said search periodicity parameter associated with said position advertisement.

* * * * *